United States Patent
Meyer et al.

(10) Patent No.: US 9,357,309 B2
(45) Date of Patent: May 31, 2016

(54) ORIENTATION BASED DYNAMIC AUDIO CONTROL

(71) Applicant: Cable Television Laboratories, Inc., Louisville, CO (US)

(72) Inventors: Mark E. Meyer, Erie, CO (US); Carey Sonsino, Golden, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 479 days.

(21) Appl. No.: 13/868,990

(22) Filed: Apr. 23, 2013

(65) Prior Publication Data

US 2014/0314239 A1 Oct. 23, 2014

(51) Int. Cl.
*H04R 5/02* (2006.01)
*H04R 5/04* (2006.01)

(52) U.S. Cl.
CPC .. *H04R 5/04* (2013.01); *H04R 5/02* (2013.01); *H04R 2420/03* (2013.01); *H04R 2420/05* (2013.01); *H04R 2499/11* (2013.01)

(58) Field of Classification Search
CPC .......... H04R 2420/03; H04R 2420/05; H04R 2499/11; H04R 5/02; H04R 5/04
USPC ............. 381/104, 107, 300, 304, 306, 334, 1, 381/58, 59, 80, 81, 85, 123, 303, 307, 311, 381/333, 388; 700/94; 345/659; 715/716
See application file for complete search history.

(56) References Cited

U.S. PATENT DOCUMENTS

| | | | | |
|---|---|---|---|---|
| 2006/0227985 A1* | 10/2006 | Kawanami | ............. | G06F 3/165 381/306 |
| 2007/0110265 A1* | 5/2007 | Kirkeby | ................ | G06F 1/1626 381/300 |
| 2011/0002487 A1* | 1/2011 | Panther | .................... | H04R 5/04 381/300 |
| 2011/0150247 A1* | 6/2011 | Oliveras | ................ | G06F 1/1688 381/304 |
| 2013/0129122 A1* | 5/2013 | Johnson | ................... | H04R 3/12 381/306 |
| 2013/0279706 A1* | 10/2013 | Marti | ...................... | G06F 3/165 381/57 |
| 2013/0321714 A1* | 12/2013 | Kobayashi | .............. | G06F 3/165 348/738 |
| 2014/0205104 A1* | 7/2014 | Ishikawa | ................. | H04S 7/302 381/58 |
| 2014/0219482 A1* | 8/2014 | Jia | ............................ | H04R 5/02 381/300 |
| 2014/0233772 A1* | 8/2014 | Giustina | ................. | H04R 5/04 381/306 |

* cited by examiner

*Primary Examiner* — Vivian Chin
*Assistant Examiner* — Friedrich W Fahnert
(74) *Attorney, Agent, or Firm* — Great Lakes Intellectual Property, PLLC.

(57) ABSTRACT

Control of audio output characteristics of the device is contemplated. The control may correspond with modifying the audio output characteristics according to an orientation of the device or other positional relationships defined between the device, the output from the device and/or speaker positioning that may vary as a result of user manipulation or an environment within which the device is being used.

9 Claims, 4 Drawing Sheets

| Stereo: Two Speaker | | | | | |
|---|---|---|---|---|---|
| | Orientation | | | | |
| Speaker | Upright | Right-Side | Left-Side | Upside-Down |
| First | Left | Right | Left | Right |
| Second | Right | Left | Right | Left |

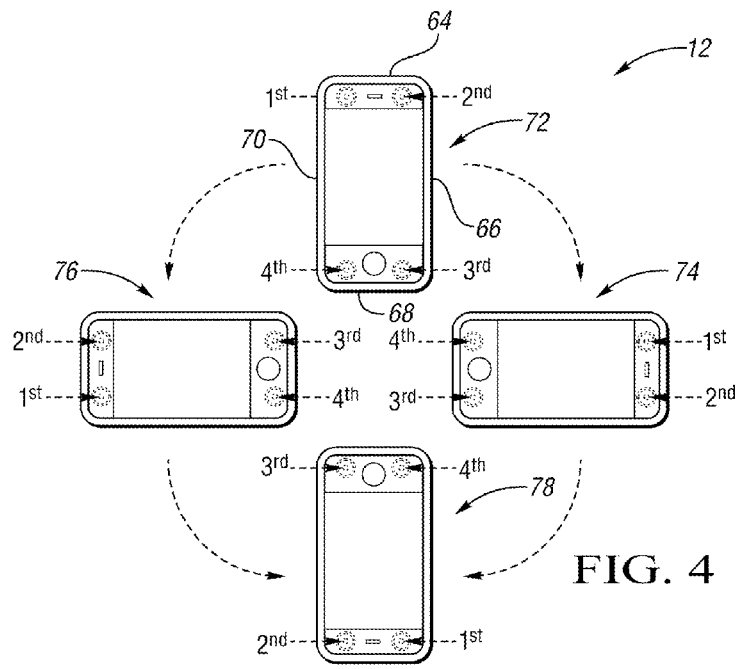

FIG. 4

Stereo:
Four Speaker

| Speaker | Orientation | | | |
|---|---|---|---|---|
| | Upright | Right-Side | Left-Side | Upside-Down |
| First | Left | Right | Left | Right |
| Second | Right | Right | Left | Left |
| Third | Right | Left | Right | Left |
| Fourth | Left | Left | Right | Right |

FIG. 5

Surround:
Four Speaker

| Speaker | Orientation | | | |
|---|---|---|---|---|
| | Upright | Right-Side | Left-Side | Upside-Down |
| First | Left Front | Right Front | Left Rear | Right Rear |
| Second | Right Front | Right Rear | Left Front | Left Rear |
| Third | Right Rear | Left Rear | Right Front | Left Front |
| Fourth | Left Rear | Left Front | Right Rear | Right Front |
| All | Partial Center | Partial Center | Partial Center | Partial Center |

FIG. 6

ORIENTATION BASED DYNAMIC AUDIO CONTROL

TECHNICAL FIELD

The present invention relates to orientation based dynamic audio control, such as but not necessarily limited to dynamically controlling audio of a device according to an orientation of the device.

BACKGROUND

Devices configured to access electronic content may include a display or other interface to facilitate communicating visual representations and one or more speakers to facilitate communicating aural representations. The device displays may be sized and shaped according to common aspect ratios, like 16:9 and 4:3, such that a viewing width of the display changes depending on whether the device is orientated in a portrait position or a landscape position. The user may adjust the orientation of the device depending on a desired viewing width and/or mode of operation, e.g., in some cases it may be desirable to orientate the device to a landscape position in order to facilitate widescreen viewing and in some other cases is may be desirable to orientated the device to a portrait position in order to facilitate data entry or narrower screen viewing. The speakers included to aurally compliment the display may be permanently affixed to particular locations of the device, such as a long a bottom side when positioned in an upright position.

The fixed positioning of the speakers causes the aural affect to vary according to orientation of the device such that an audio output location or area where the user perceives the aural representations may change according to the orientation of the device. This aural variance can disrupt the user experience. One non-limiting aspect of the present invention contemplates dynamically controlling device audio based on device orientation in order to mitigate and/or control such aural variances in a desirable manner.

BRIEF DESCRIPTION OF THE DRAWINGS

FIG. 4 illustrates implementation of orientation-based dynamic audio in accordance with one non-limiting aspect of the present invention.

FIG. 5 illustrates an audio characteristic output table in accordance with one non-limiting aspect of the present invention.

FIG. 6 illustrates an audio characteristic output table in accordance with one non-limiting aspect of the present invention.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
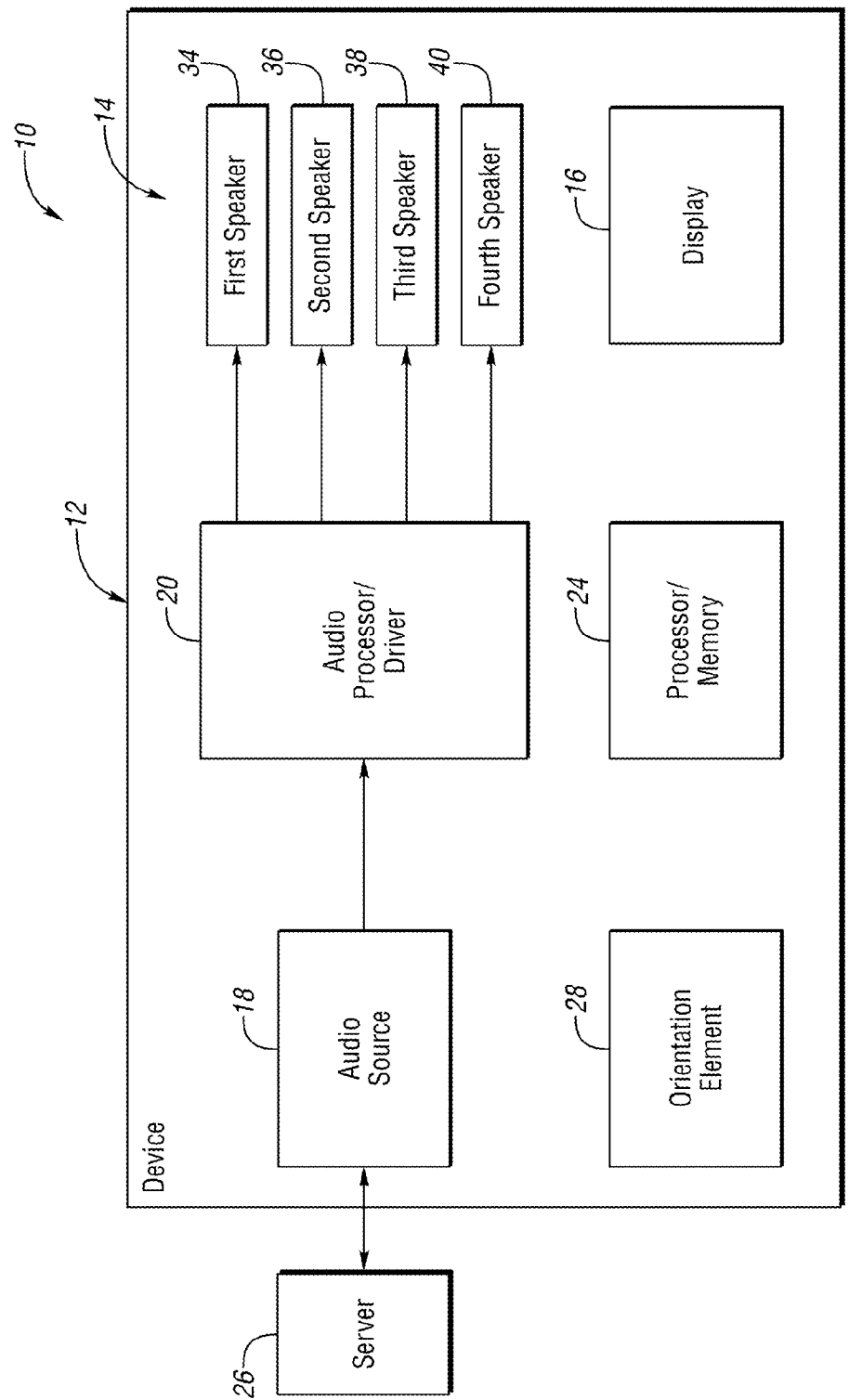
FIG. 1 illustrates an audio system in accordance with one non-limiting aspect of the present invention.

FIG. 1 illustrates an audio system 10 in accordance with one non-limiting aspect of the present invention. The system 10 includes a device 12 configured to facilitate dynamic audio control based on orientation. The audio control may facilitate controlling audio output from a plurality of speakers 14 included on the device 12 in order to mitigate and/or control aural variances resulting from orientation modifications. The device 12 may be any type of the electronically operable device having capabilities sufficient to facilitate generating audio outputs using one or more of the plurality of speakers 14, such as but not necessary limited to a tablet, a computer, a mobile phone, a smart phone, a television or other device sufficiently sized and/or configured to allow user manipulation of its physical orientation and/or the orientation of its display 16 or other user interface. Orientation changes, for example, may occur if the device 12 is a handheld device when a user rotates the device 12 from one position to another and/or if the device 12 is a fixed or a less movable device when the user changes a setting or aspect ratio of the display 16.

The device may include an audio source 18 configure to source audio to an audio processor and/or driver 20. The audio processor 20 may be configured to process or otherwise manipulate audio signaling received from the audio source 18 prior to receipt at one or more of the plurality of speakers 14. A processor and/or memory 24 may include computer-readable instructions stored thereon that embody a computer program product, application or software sufficient to facilitate controlling the audio processor 20 in the manner contemplated by the present invention to facilitate dynamic audio control based on orientation. In particular, the processor 24 may be configured to provide instructions to audio processor 20 to control audio signals delivery to each one or more of the plurality of speakers 14 in order to mitigate and/or control aural variations resulting from orientation modifications. The audio source 18 may be configured to source audio from content stored within the memory 24 and/or from signaling received from a remote server 26, such as media transmitted over the Internet or other communication medium, such as but not necessary limited to a cable television network. Optionally, the audio source 18 and/or a network interface (not shown) may be configured to exchange information with the server 26 in order to facilitate receipt of media and/or to advise the server 26 as to device capabilities for processing particular types of media.

The device 12 may include an orientation element 28 configured to assess orientation, movement, and other positional related variances. The orientation element 28 may be a gyroscope, an accelerometer or other feature having capabilities sufficient to assess movement of the device 12. The rotation element 28 may be configured to track movements and other parameters of the device 12 in order to facilitate assessing orientation. The orientation element 28 may communicate orientation related information to the processor 24 to facilitate dynamically controlling operation of the audio processor 20 in the manner contemplated by the present invention. While the device 12 is shown to include a number of standalone components, the components may be integrated and/or the operations associated therewith may be performed by other components. Additionally, any one or more the components may be configured to facilitate communications with any one or more of the other components, such as over a network or an internal communication bus. The device 12 illustrates a plurality of speakers comprising a first speaker 34, a second speaker 36, a third speaker 38 and a fourth speaker 40 for exemplary non-limiting purposes. The device 12 may include more or less than the four illustrated speakers depending on its particular configuration and/or multiple speakers may be included but disabled from operation, such as according to user preferences, audio/media processing limitations or other operational parameters. Optionally, one or more of the plurality of speakers 14 may be remotely connected to the device 12, such as through a cable or a wireless connection.

The present invention is predominately described with respect to the audio source 18 communicating audio signals to the audio processor 20 as a function of audio recovered from media being played or otherwise interfaced with a user through the display 16. This is done without necessarily intending to limit the scope and contemplation of the present invention as the contemplated orientation-based dynamic audio control may be similarly performed and/or applicable when the device 12 is not providing video or other movable content to the display 16 and/or while the display 16 is inactive or disabled. The coordinated use of audio and video is presented for exemplary purposes as the present invention particularly contemplates the desirability of facilitating dynamic audio control in concert with user manipulations associated with controlling presentation of video shown through the display 16. The display 16 may be sized and shaped according to a common aspect ratio, like 16:9 and 4:3, such that a viewing width of the display 16 changes depending on whether the device 12 is orientated in a portrait position or a landscape position. The device 12 may recognize the orientation and implement a corresponding portrait mode or landscape mode to facilitate adjusting the display 16 to implement the desired viewing width. The audio output from the speakers 14 to aurally compliment the display 16 may be dynamically controlled in accordance the current orientation.

Figures 2, 3:
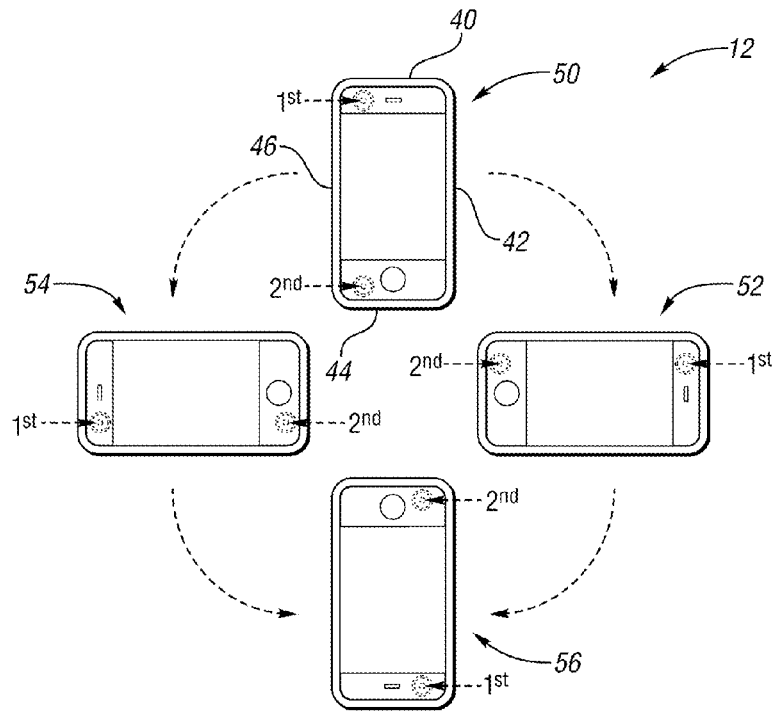
FIG. 2 illustrates implementation of orientation-based dynamic audio in accordance with one non-limiting aspect of the present invention.
FIG. 3 illustrates an audio characteristic output table in accordance with one non-limiting aspect of the present invention.

FIG. 2 illustrates implementation of orientation-based dynamic audio control when the device 12 includes two active speakers in accordance with one non-limiting aspect of the present invention. The two active speakers are for exemplary purposes referred to as the first speaker (1st) and the second speaker (2nd) illustrated in FIG. 1. The device may include a topside 40, a right side 42, a bottom side 44 and a left side 46 as defined when orientated in an upright position 50. The first speaker may be positioned proximate the top side 40 and the second speaker may be diametrically opposed proximate the bottom side 44. The first and second speakers are shown to be offset slightly toward a left side of the device 12 when orientated in the upright position, which may be beneficial in differentiating distinct landscape modes (left from portrait and right from portrait). Optionally, the first and second speakers may be positioned along a centerline or equal distance from the right side 42 and the left side 46 without deviating from the scope and contemplation of the present invention. Exemplary orientation manipulation of the device 12 is shown to correspond with a 90° rightward rotation from the upright position 50 to a right-side position 52, a 90° left for rotation from the upright position 50 to a left-side position 54 and a 180° rotation from the upright position 50 to an upside down position 56. The upright position 50 and upside down position 56 may correspond with portrait positioning and the right-side position 52 and the left-side position 54 may correspond with landscape positioning, thereby defining first, second, third and fourth orientations.

FIG. 3 illustrates an audio characteristic output table 60 in accordance with one non-limiting aspect of the present invention. The audio characteristic output table 60 describes audio output characteristics of the two-speaker device 12 depending on its orientation when a stereo audio signal is provided from the audio source 18 to the audio processor 20. The stereo audio signal may include a plurality of audio channels to be output through the first speaker and the second speaker in order to provide stereo sound. The audio channels may include a left channel and a right channel where the left channel is intended to provide a leftward aural representation and the right channel is intended to provide a rightward aural representation. The audio processor may be configured to differentiate the left channel and the right channel from a common signaling stream received from the audio source 18 and/or the channels may be separately transmitted to the audio processor 20. One non-limiting aspect of the present invention contemplates dividing the left channel and the right channel between the first speaker and the second speaker depending on a current orientation of the device 12. The left channel and right channel division may correspond with providing an entirety of the left channel to one of the first and second speakers and the entirety of the right channel to the other one of the first and second speakers, i.e., without both speakers outputting a portion or combination of the left and right channels.

The one of the left channel and the right channel received by each of the first speaker and the second speaker may vary depending on orientation of the device 12 such that when in one of the landscape positions, the speaker currently leftward or on the left side of the device 12 receives the left channel and the speaker currently rightward or on the right side of the device 12 receives the right channel. When in one of the portrait positions, neither one of the first and second speakers is positioned more leftward or rightward than the other one of the first and second speakers such that the speakers designated to receive the left and right channels may be arbitrarily designated, such as according to user preferences and/or design parameters. The audio characteristic output table 60 illustrates one exemplary scenario where the first speaker receives the left channel when in the upright position 50 and the right channel when in the upside down position 56 in order to maintain relative left and right channel output locations when the device 12 rotates from the upright position 50 to the upside down position 56. Optionally, the initial left and right channel assignments selected for the upright position 50 may remain constant for other portrait positioning, i.e., the same speaker may continue to be received the same one of the left channel and the right channel whenever in a portrait position.

The two-speaker configuration shown in FIG. 2 is believed to be beneficial in improving the aural experience by positioning the first and second speakers at opposite ends of the device 12 so that left and right channels can be differentiated when landscape orientation is achieved. When the device 12 is in a portrait position, the opposed positioning of the first and second speakers may provide at least some left channel and right channel differentiation due to the offset, top-bottom positioning. The present invention also contemplates the first and second speakers being positioned along a common side of the device, however, such a configuration is believed to be less beneficial, particularly when the device 12 is in the landscape position since the desired left and right channel aural origination would not be as recognizable as with the opposed configuration. While there may be some spatial perception benefit to including the first and second speakers on a common side when the device is orientated in one of the portrait positions, the opposed configuration is believed to provide sufficient spatial perception benefit when in the portrait position, particularly when compared to the limited ability of a common-sided speaker configuration to provide desirable spatial differentiation when in one of the landscape positions.

FIG. 4 illustrates implementation of orientation-based dynamic audio control when the device 12 includes four active speakers in accordance with one non-limiting aspect of the present invention. The four active speakers are for exemplary purposes referred to as the first (1st), second (2nd), third (3rd) and fourth (4th) speakers illustrated in FIG. 1. The device 20 may include a top side 64, a right side 66, a bottom side 68 and a left side 70 as defined when orientated in an upright position 72. The first speaker may be positioned proximate a top-left side, the second speaker may be positioned proximate a top-right side, the third speaker may be positioned proximate a bottom-right side and the fourth speaker may be positioned proximate a bottom-left side. Exemplary orientation manipulation of the device is shown to correspond with a 90° rightward rotation from the upright position 72 to a right-side position 74, a 90° left for rotation from the upright position 72 to a left-side position 76 and a 180° rotation from the upright position 72 to an upside down position 78. The upright position 72 and upside down position 78 may correspond with portrait positioning and the right-side position 74 and the left-side position 76 may correspond with landscape positioning, thereby defining first, second, third and fourth orientations.

FIG. 5 illustrates four-speaker, stereo audio characteristic output table 80 in accordance with one non-limiting aspect of the present invention. The audio characteristic output table 80 describes audio output characteristics of a four-speaker device depending on its orientation when the above-described stereo audio signal is provided to the audio processor. One non-limiting aspect of the present invention contemplates dividing the left channel and the right channel between the first, second, third and fourth speakers depending on a current orientation of the device 12. The left and right channel division may correspond with sharing the left channel with the two most leftwardly positioned speakers and sharing the right channel with the two most rightwardly positioned speaker where the speaker assignments are dynamically determined according to a current orientation of the device 12. In the event the device 12 includes additional speakers, including speakers positioned along a center of one of the sides, the leftwardly and rightwardly positioned speakers may be determined to be the one or more most extremely positioned speakers. Optionally, any centrally positioned speakers, if more speakers were included, may be temporarily disabled or not routed left and right channels in order to achieve a desired left and right balance with the remaining speakers. In the event no speakers are determined to be more leftwardly or rightwardly than the others, user preference or design parameters may be utilized to assign the left and right channels to a corresponding one or more of the speakers.

FIG. 6 illustrates four-speaker, surround sound audio characteristic output table 82 in accordance with one non-limiting aspect of the present invention. The audio characteristic output table 82 describes audio output characteristics of a four-speaker device depending on its orientation when a surround sound audio signal is provided to the audio processor 20. The surround sound signal may include a left front channel, a left rear channel, a right front channel, a right rear channel and a center channel. The surround sound signal may be intended for output through five, spatially diverse speakers positioned at corresponding left, right, rear, front and center positions. One non-limiting aspect of the present invention contemplates achieving virtual surround sound by selectively partitioning the left rear, left front, right rear, right front and center channels to one or more of the less spatially diverse first, second, third and fourth speakers in manner that mimics surround sound. The audio processor 20 may include capabilities sufficient to enable delivery of multiple channels to a single or more of the speakers, e.g., portions of one channel may be simultaneously output by multiple speakers, a single speaker may simultaneously output multiple channels, one or more speakers may output one or more channels at different intervals and/or at imperceptible temporal offsets, etc.

One non-liming aspect of the present invention contemplates the audio processor 20 audibly mixing the surround sound channels for the four speaker configuration in a manner that simulates or provides virtually surround sound. The surround sounds table 82 indicates one exemplary configuration for virtually surround sounds where each speaker outputs one of the left front, left rear, right front and right rear channels while also outputting a portion of the center channel. Of course, the present invention is not necessarily so limited and fully contemplates other partitioning of the surround sound channels, including the use of additional speakers, such as a dedicated center channel speaker or multiple speakers positioned elsewhere on or outside of the device 12. The virtually surround sound contemplates providing the left channels (either or both of the left rear and left front) to the leftwardly positioned speakers for a current orientation and the providing the right channels (either or both of the right rear and right front channels) to the rightwardly positioned speakers for the current orientation. Optionally, additional speakers may be disabled or prevented from receiving surround sound channels in order to enhance or otherwise control the audible locations at which certain surround sound channels are perceived.

Figure 7:
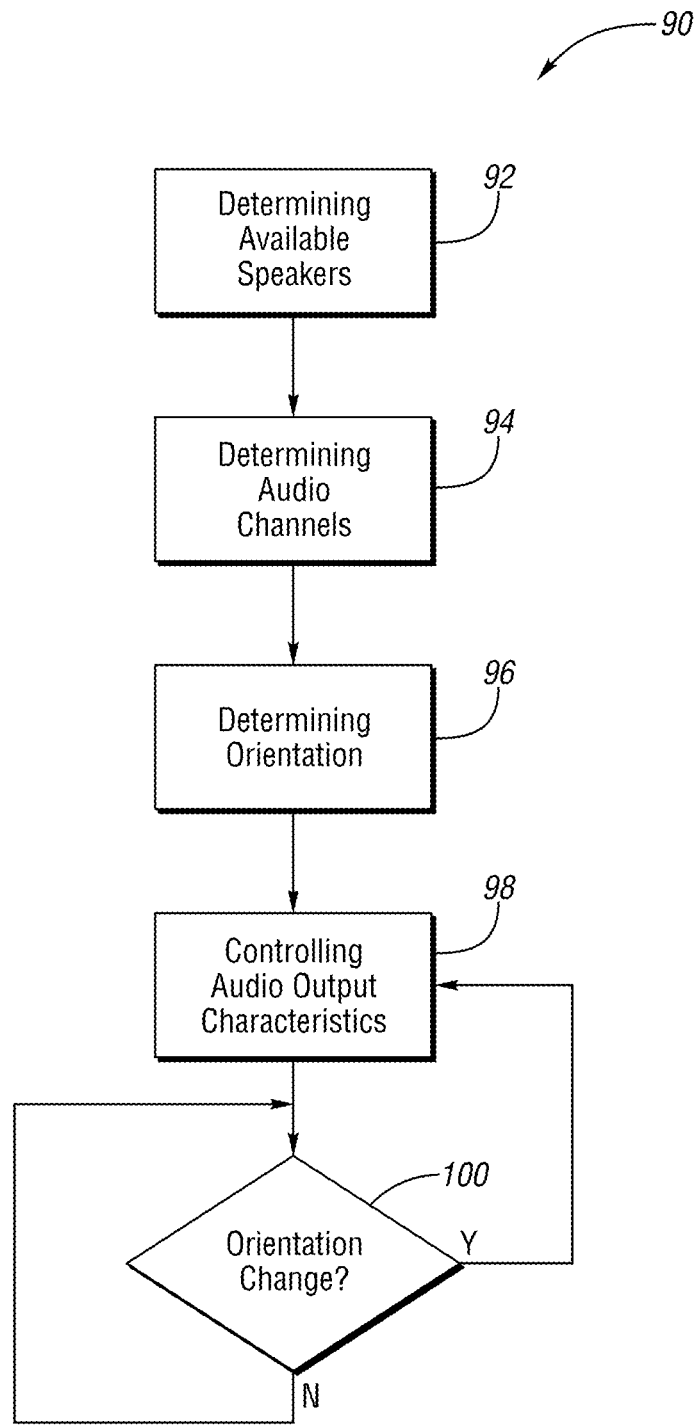
FIG. 7 illustrates a flowchart of a method for controlling audio output characteristics in accordance with one non-limiting aspect of the present invention.

FIG. 7 illustrates a flowchart 90 of a method for controlling audio output characteristics of a device in accordance with one non-limiting aspect of the present invention. The method may be embodied in a computer-readable medium included on the device having non-transitory instructions sufficient for controlling audio output characteristics of the device according to the contemplated processes. Optionally, instructions or other commands may be instigated from a remote device, such as a server or content player, to facilitate remotely controlling the audio output characteristics in a similar manner. The device may correspond with one of the above-described two or four speaker devices or another device having the same numbers of speaker positioned at different locations and/or another device having more or less speakers. The audio output characteristics are predominantly described with respect to being controlled as a function of an orientation of the device for exemplary non-limiting purposes as the present invention fully contemplates facilitating similar audio output controls when the orientation of the device remains constant while the orientation of displayed content changes or other orientation of features of the device are manipulated in a manner where it may be desirable to facilitate coordinated audio output controls.

Block 92 relates to determining speakers available on the device to facilitate audio output. The speaker availability may include identifying a location of the speaker and addressing or other information sufficient to control signal deliver to the speakers. The present invention is not necessarily limited control audio signals delivered to speakers and fully contemplates its use and application in controlling audio characteristics for signal delivered to other types of interfaces. The speakers are assumed to be permanently affixed to or included as part of the device, however, the present invention fully contemplates one or more of the speakers being plugged into the device and/or capable of wireless receiving audio channels. In the event of such speakers, the relative positioning of those speakers may be considered and relied upon to achieve the contemplated audio fidelity. Block 94 relates to determining the audio channels desired for output, e.g., the above-described audio channels associated with stereo or surround sound or some of set of audio signals having corresponding directionality requirements.

Block 96 relates to determining an orientation of the device and/or the display through which media or content is to output and relative to which the audio output is to be controlled. The orientation is predominately described with respect to the device whereby the relative positioning of the speakers is correspondingly determined due to being permanently affixed to the device. Similar processes may occur in the event the speakers are movable, e.g., wireless speakers receiving wireless signals from the device may deployable in different positions arrangements. Block 98 relates to controlling the audio output characteristics of the device according to the current orientation or other determination of speaker positioning. The orientation may be determined according to the above described orientations, and optionally with the use of angular threshold or other position related parameter needed to sufficiently categorize relative positioning of the available speakers, e.g. the relative leftward and rightward positioning of each speaker and/or or additional speaker positioning dynamics.

The audio output characteristics may be controlled according to a plurality of available characteristics used to define mapping or other preferences for individually assigning each determined audio channel to a selectable one or more the speakers. As described above, one audio output characteristics may generally relate to controlling left and right audio channels to the one or more speakers determined to be correspondingly positioned leftwardly and rightwardly relative to the vertical axis of the device as defined for its current orientation. The audio output characteristics may include additional controls, such as more detail designations that specified particular positioning for audio channels having more granular directionality requirements e.g., audio channels that may have rear and front designations in addition to left and right designations. The audio output characteristics may also be adapted according to the available audio channels, such as to facilitate virtual surround sound and/or use of channels having multiple directionality components, i.e., a center audio channel. Block 100 relates to determining changes in orientation and implement a corresponding adjustments, such as by controlling audio channels to different speakers following an orientation change in order to maintain a consistent output.

As supported above, one non-limiting aspect of the present invention contemplates a mechanism for modifying mobile device audio output depending on the rotation orientation of the device, such as to avoid audio being perceived at a single side of the device. A design having two speakers, one on the top edge and one on the bottom edge of the device, is contemplated. With this design, the audio signal may be controllable to originate from both sides of the device when in landscape orientation. Taking advantage of and embedded device gyroscope can help to realize additional benefits. For example, software can detect whether the device is in a portrait orientation or a landscape orientation. If the device is in a portrait orientation, the operating system could decide to turn off one of the speakers to save power. The gyroscope can also assist in giving the user a better audio experience by detecting whether the device is in landscape orientation by turning left 90 degrees or right 90 degrees from portrait and/or the correct audio channel could be sent to the appropriate speaker. The left audio channel can be sent to the left side of the device, and the right audio channel can be sent to the right side of the device, regardless of which landscape orientation the device is currently in.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for controlling audio output characteristics of a device, the device including a plurality of speakers configured to output audio as a function of audio channels received from an audio driver, the method comprising:
   controlling the output characteristics of the device according to a first characteristic when a first orientation is determined, the first characteristic dividing audio channels between at least a first speaker and a second speaker of the plurality of speakers;
   controlling output characteristics of the device according to a second characteristic when a second orientation is determined, the second characteristic dividing the audio channels between the first and second speakers differently than the first characteristic; and
   when the audio channels include a left front channel, a left rear channel, a right front channel and a right rear channel and the device includes a third speaker and a fourth speaker and each speaker receives no more than one of the left front, left rear, right front and right rear channels, controlling the output characteristics such that:
   i) the first characteristic corresponds with:
      (1) the first speaker transmitting the left front channel;
      (2) the second speaker transmitting the right front channel;
      (3) the third speaker transmitting the right rear channel;
      (4) the fourth speaker transmitting the left rear channel; and
   ii) the second characteristic corresponds with:
      (1) the first speaker transmitting the right front channel;
      (2) the second speaker transmitting the right rear channel;
      (3) the third speaker transmitting the left rear channel; and
      (4) the fourth speaker transmitting the left front channel.

2. The method of claim 1 further comprising:
   determining the first orientation to correspond with an upright position of the device;
   determining the second orientation to correspond with a right-side position of the device, the right-side position corresponding with a 90° rightward rotation of the device from the upright position;
   determining a third orientation to correspond with a left-side position of the device, the left-side position corresponding with a 90° leftward rotation of the device from the upright position; and
   controlling output characteristics of the device according to a third characteristic when the third orientation is determined, the third characteristic dividing the audio signals between the first and second speakers differently than at least the second characteristic.

3. The method of claim 2 further comprising:
   determining a fourth orientation to correspond with an upside down position of the device, the upside down position corresponding with a 180° rotation of the device from the upright position; and controlling output characteristics of the device according to a fourth characteristic when the fourth orientation is determined, the fourth characteristic dividing the audio signals between the first and second speakers differently than the first characteristic.

4. The method of claim 1 further comprising:

determining the first orientation to correspond with an upright position of the device; and determining the second orientation to correspond with a right-side position of the device, the right-side position corresponding with a 90° rightward rotation of the device from the upright position.

5. The method claim 4 further comprising:

determining a third orientation to correspond with a left-side position of the device, the left-side position corresponding with a 90° leftward rotation of the device from the upright position; and controlling output characteristics of the device according to a third characteristic when the third orientation is determined, the third characteristic dividing the audio signals such that:
i) the first speaker transmits the left rear channel;
ii) the second speaker transmits the left front channel;
iii) the third speaker transmits the right front channel; and
iv) the fourth speaker transmits the right rear channel.

6. The method of claim 5 further comprising:

determining a fourth orientation to correspond with an upside down position of the device, the upside down position corresponding with a 180° rotation of the device from the upright position; and controlling output characteristics of the device according to a fourth characteristic when the fourth orientation is determined, the fourth characteristic dividing the audio signals such that:
i) the first speaker transmits the right rear channel;
ii) the second speaker transmits the left rear channel;
iii) the third speaker transmits the left front channel; and
iv) the fourth speaker transmits the right front channel.

7. The method of claim 1 further comprising, when the audio channels include a center channel, controlling the output characteristics such that each of the first and second characteristics correspond with the first, second, third and fourth speakers each transmitting at least a portion of the center channel.

8. A method for controlling audio output characteristics of a device, the device including a plurality of speakers configured to output audio as a function of audio channels received from an audio driver, the method comprising:

determining a first orientation to correspond with an upright position of the device;

determining a second orientation to correspond with a right-side position of the device, the right-side position corresponding with a 90° rightward rotation of the device from the upright position;

determining a third orientation to correspond with a left-side position of the device, the left-side position corresponding with a 90° leftward rotation of the device from the upright position;

controlling the output characteristics of the device according to a first characteristic when the first orientation is determined, the first characteristic dividing audio channels between at least a first speaker and a second speaker of the plurality of speakers;

controlling output characteristics of the device according to a second characteristic when the second orientation is determined, the second characteristic dividing the audio channels between the first and second speakers differently than the first characteristic; and controlling output characteristics of the device according to a third characteristic when the third orientation is determined, the third characteristic dividing the audio signals such that:
i) the first speaker transmits the left rear channel;
ii) the second speaker transmits the left front channel;
iii) the third speaker transmits the right front channel; and
iv) the fourth speaker transmits the right rear channel.

9. A method for controlling audio output characteristics of a device, the device including a plurality of speakers configured to output audio as a function of audio channels received from an audio driver, the method comprising:

determining a first orientation to correspond with an upright position of the device;

determining a second orientation to correspond with a right-side position of the device, the right-side position corresponding with a 90° rightward rotation of the device from the upright position;

determining a fourth orientation to correspond with an upside down position of the device, the upside down position corresponding with a 180° rotation of the device from the upright position;

controlling the output characteristics of the device according to a first characteristic when the first orientation is determined, the first characteristic dividing audio channels between at least a first speaker and a second speaker of the plurality of speakers;

controlling output characteristics of the device according to a second characteristic when the second orientation is determined, the second characteristic dividing the audio channels between the first and second speakers differently than the first characteristic; and controlling output characteristics of the device according to a fourth characteristic when the fourth orientation is determined, the fourth characteristic dividing the audio signals such that:
i) the first speaker transmits the right rear channel;
ii) the second speaker transmits the left rear channel;
iii) the third speaker transmits the left front channel; and
iv) the fourth speaker transmits the right front channel.

* * * * *